May 24, 1938.  G. W. SCHATZMAN  2,118,624
FENDER SHIELD CONSTRUCTION
Filed Jan. 18, 1937  2 Sheets-Sheet 1
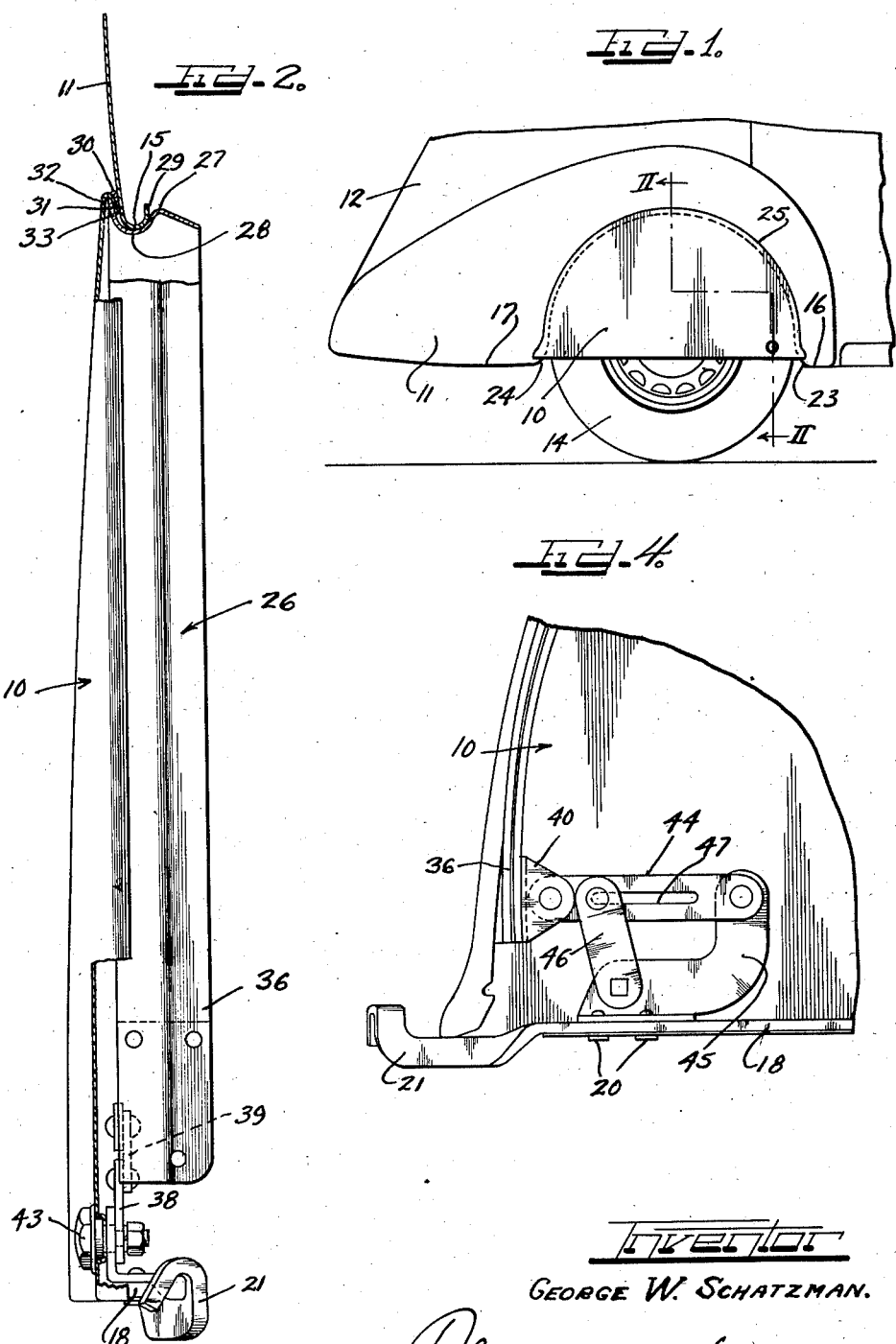
Inventor
GEORGE W. SCHATZMAN.

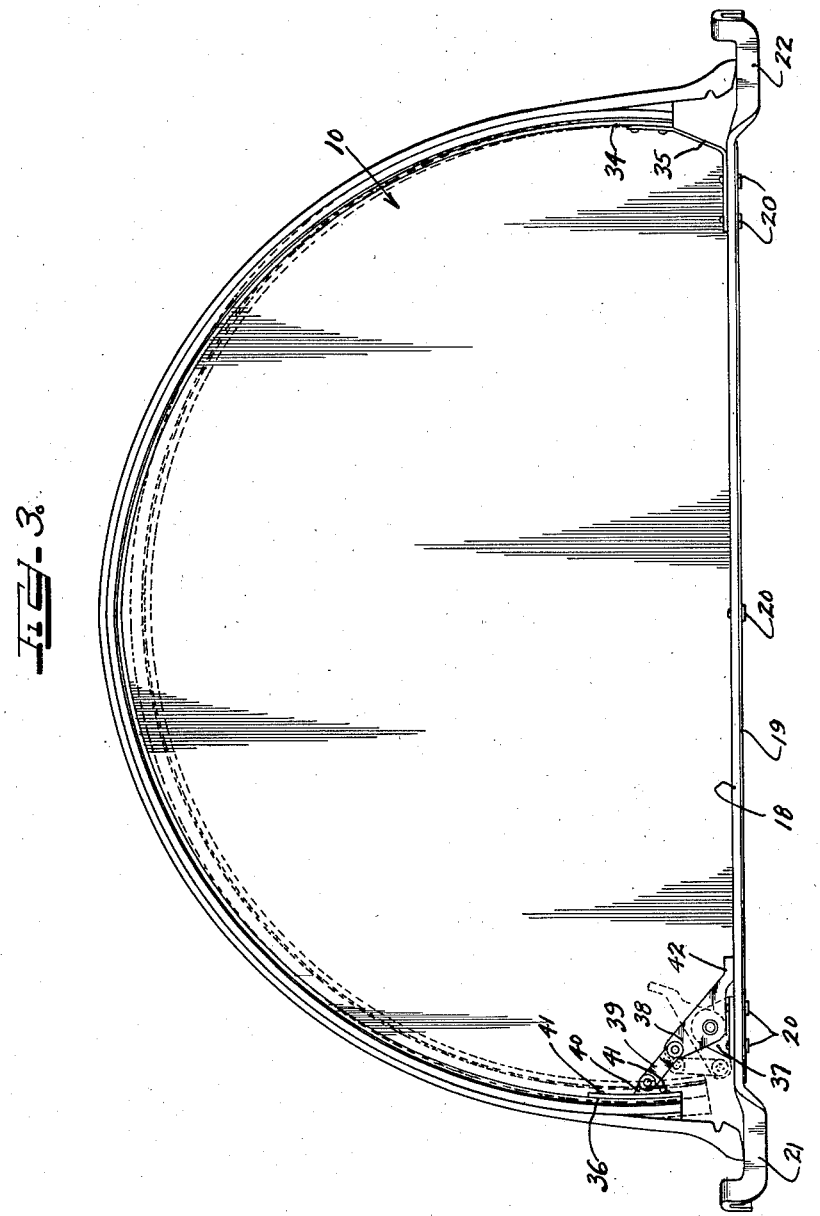

Patented May 24, 1938

2,118,624

UNITED STATES PATENT OFFICE 2,118,624

FENDER SHIELD CONSTRUCTION

George W. Schatzman, Detroit, Mich., assignor, by mesne assignments, to Houdaille-Hershey Corporation, Detroit, Mich., a corporation of Michigan Application January 18, 1937, Serial No. 121,115

13 Claims. (Cl. 280—153)

This invention relates to ornamental fender shields, and more particularly to an ornamental fender shield having a fastening flange of novel form which is secured thereto in a novel manner.

In the manufacture of ornamental fender shields, it has been found highly desirable, from the standpoint of economy of production, to construct a shield of some relatively inexpensive and soft steel. When a steel of this type is used, however, difficulties are encountered due to the fact that soft steel does not readily lend itself to the formation of a fastening flange on the shield which detachably engages the vehicle fender. This has been found to be particularly true where the fastening flange is designed to make a snap-on engagement with the underturned opening defining edge of the vehicle fender. It has been found that a flange of this type should preferably be composed of spring steel or some other suitable resilient material.

It has also been found particularly desirable, in the manufacture of ornamental fender shields, to construct a fender shield which will readily lend itself to slight deviations in the normal dimensions of the vehicle fender to which it is to be applied. One of the important features of the present invention is the provision of a novel construction which readily lends itself to application to vehicle fenders whose dimensions vary slightly during the manufacturing process.

It is an object of this invention to provide an ornamental fender shield possessing the above highly desirable characteristics.

It is another object of this invention to provide a novel ornamental fender shield which is economical to manufacture and which is rugged and reliable in use.

It is a further object of this invention to provide a fender shield having a fastening flange of novel form which is secured to the fender shield in a novel manner.

Another object of this invention is to provide a novel method and means for securing a fender engaging and fastening flange in an ornamental fender shield.

Another and further object of this invention is to provide a novel ornamental fender shield having a rearwardly extending fender fastening flange which is adapted to be contracted and expanded through a predetermined range at will.

A still further object of this invention is to provide a novel mechanical movement for the fender fastening means of an ornamental fender shield whereby the fender shield may be readily and quickly mounted and dismounted from a vehicle fender.

The novel features which I believe to be characteristic of my invention are set forth with particularity in the appended claims. My invention itself, however, both as to its organization and manner of construction, together with further objects and advantages thereof, may best be understood by reference to the following description taken in connection with the accompanying drawings, in which:

Figure 1 is a front elevational view illustrating a vehicle fender and an ornamental shield mounted thereon;

Figure 2 is a side elevational view, partly in cross-section, of the fender shield illustrated in Figure 1;

Figure 3 is a rear elevational view illustrating the manner in which the rearwardly extending fastening flange of the fender shield of Figure 1 is secured thereto; and Figure 4 is an enlarged fragmentary rear elevational view of one end of the ornamental fender shield, showing a modified arrangement for effecting contraction and expansion of the fender fastening flange.

In Figure 1 of the drawings, I have illustrated a fender shield 10 constructed in accordance with the teachings of the present invention and assembled on a rear fender 11 of an automobile 12. The fender 11 is formed with the usual opening 13 which affords access to the vehicle wheel and which permits ready removal of the wheel 14 in an axial direction. The ornamental fender shield 10 is disposed over the opening 13 in such a manner as to substantially close the opening and to harmonize with the outer side wall of the fender 11. The outer surface of the shield 10 may, of course, be substantially smooth, as is illustrated in the drawings, or it may assume any other desired configuration for purposes of ornamentation.

As shown in Figure 2 of the drawings, the outer marginal edge of the fender 11 which defines the opening 13 is underturned as at 15. Although not specifically illustrated, it is to be understood that the outer marginal edges of the fender 11 which define the base of the fender 11, as is indicated at 16 and 17, are also underturned in a manner similar to the underturned edge 15. As is well known by those skilled in the art, fenders of the high crown type are generally provided with these underturned edge portions to increase the rigidity of the fender. As will presently be explained, advantage is taken of this feature to assemble and secure the ornamental fender shield in the fender opening.

In order to provide a suitable support for the fender shield 10, a bar 18 is secured to the base 19 of the fender shield 10 in any suitable manner, such as by a plurality of bolts 20 (see Figure 3). The bar 18 is so dimensioned as to extend beyond either end of the shield 10 to form trunnion members 21 and 22 which are adapted to be supported by the underturned edges 16 and 17, respectively, of the fender 11. The particular configuration of the trunnion members 21 and 22 may, of course, vary through wide limits without departing from the spirit and scope of the present invention, it being only necessary to shape the ends of the bar 18 so that they will extend around the underturned corners 23 and 24 of the fender 11, and then downwardly into engagement with the channels formed by the underturned edges 16 and 17. As will presently be understood, the trunnion members 21 and 22 form a convenient support for the fender shield 10 and permit the fender shield 10 to be rocked in the desired position on the vehicle fender 11.

While the trunnion members 21 and 22 support the fender shield 10, it will be observed that it is necessary to provide some means which will detachably hold the curved edge 25 of the shield 10 firmly against the fender 11. One form of fastening means that has been found highly desirable is to provide a rearwardly extending flange 26 on the shield 10 in proximity to the curved edge 25 shaped in such a manner as to retain the fender shield 10 in desired position on the fender 11. One form of flange 26 which has been found highly successful in practice includes a hump portion 27 (see Figure 2). The intermediate portion 28 of the flange 26 is preferably shaped to assume approximately the same curvature as that of the underturned edge 15 of the fender 11, while the hump portion 27 is arranged to bear against the rear face 29 of the underturned edge 15. It will thus be apparent that as the fender shield 10 is rocked in to desired position about the trunnion members 21 and 22, the flange 26 is cammed beneath the underturned edge 15 of the fender 11. As the hump portion 27 of the flange 26 passes beneath the lowermost point of the underturned edge 15, the rearward free portion of the flange 26 is snapped up against the rear surface 29 of the underturned edge 15 to hold the fender shield 10 in tight engagement with the fender 11. A cushioning ring 30 of rubber or some other suitable material may be disposed in the channel formed by the intermediate portion 28 of the flange 26 to prevent rattling, if desired.

Inasmuch as it is desirable to construct the flange 26 of some suitable resilient material, such as spring steel, and from a manufacturing standpoint, to construct the fender shield 10 of some more economical material, such, for example, as soft steel, the present invention provides a novel arrangement whereby the fender shield assembly may be constructed in a novel manner, of a plurality of elements. To this end, the curved edge 25 of the fender shield 10 is bent back on itself, as at 31, to form a recess 32. A separate flange element having a cross-sectional configuration including a forward radially outwardly extending edge 33 as illustrated in Figure 2, is constructed of some suitable resilient material, such as spring steel. As will be seen upon close inspection of Figures 2 and 3, the edge 33 of the flange 26 is arranged so that its upper intermediate portion is normally disposed in the recess 32.

If some means is now provided for expanding and contracting the flange 26, it will readily be understood that the fastening flange 26 will be readily adjusted for center openings that deviate slightly in dimension due to lack of close control in the manufacturing process, and at the same time it will provide a ready means by which the fastening flange 26 may be disengaged from the underturned opening defining edge 15 of the fender 11. One method of thus disposing the fastening flange 26 on the fender shield 10 is illustrated in Figures 2 and 3 of the drawings. One end 34 of the fastening flange 26 is secured to the fender shield 10 by means of an L-shaped backet 35 which is secured to the base of the fender shield 10 by means of two of the bolts 20 which secure the rod 18 to the base portion 19.

As will readily be understood after a close inspection of Figure 3, the forward edge 33 of the fastening flange 26 is normally disposed in the recess 32 of the fender shield 10. Thus, insofar as the respective end of the flange 26 is concerned, the flange is permanently secured to the fender shield both with regard to movement in the plane of the shield as well as in regard to movement perpendicular to the plane of the shield.

The opposite end 36 of the fastening flange 26 is mounted for movement to and away from the base of the fender shield, the preferred arrangement by which this movement is obtained being illustrated in Figure 3 of the drawings. A bracket 37 is secured to the base of the fender shield 10 by means of two of the bolts 20 which secure the rod 18 to the base 19. Rotatably mounted on the bracket 37 is a bell crank arm 38 having one end thereof connected through an intermediate link 39 to a bracket 40 carried on the free end 36 of the flange 26. The bracket 40 may be secured to the free end 36 of the flange 26 in any suitable manner, such as by means of rivets 41. The link mechanism including the bell crank 38 and the intermediate link 39 is of the usual free link mechanism type, wherein each of the elements of the link mechanism is freely connected to its associated element. It is also to be understood that when the free end 36 of the flange 26 is in its uppermost position, the bell crank 38 and link arm 39 are in an over-center position, thereby locking the free end 36 in its uppermost position. As will be seen from an inspection of Figure 3 of the drawings, the opposite side of the bell crank 38 is provided with a stop 42 which prevents further movement of the bell crank arm 38 in a clockwise direction after it has passed its over-center position with respect to the link arm 39.

As the bell crank arm 38 is rotated in a counter-clockwise direction, as viewed in Figure 3 of the drawings, it is apparent that the free end 36 of the flange 26 will be drawn downwardly to a position as indicated by the dotted lines in Figure 3. When the free end 36 of the flange 26 is in its downward position, it will readily be understood that the entire length of the fastening flange is thus contracted to a certain extent, as is indicated by the dotted lines. This contraction of the fastening flange 26 is sufficient to permit disengagement of the hump portion 27 of the fastening flange from the underturned opening defining edge 15 of the fender 11, wherein the fender shield may be readily rocked out of its engaged position therewith.

To mount the fender shield 10 in the wheel opening of the vehicle fender 11, it is simply necessary to hook the trunnion members 21 and 22 into engagement with the underturned base edges 16 and 17 of the fender 11 and then rock the fender shield 10 about the trunnion members until the hump portion 27 of the fastening flange 26 passes beneath the underturned opening defining edge 15 of the fender 11. The bell crank arm 38 is then rotated so as to raise the free end 36 of the flange 26, thereby causing the fastening flange 26 to extend into tight engagement with the underturned edge 15 of the fender 11. Any suitable mechanism may be provided for rotating the bell crank arm 38, such, for example, as a stud bolt 43 which extends through the fender shield 10, as is indicated in Figure 2 of the drawings, it being understood that the bell crank arm 38 is rigidly secured to the bolt shaft in any convenient manner.

A modified form of link mechanism for moving the free end 36 of the fastening flange 26 is illustrated in Figure 4 of the drawings. In this arrangement, a slotted lever 44 is provided, one end of which is pivotally secured to the bracket 40 on the flange 26, while the other end is pivotally secured to a bracket 45 carried on the base 19 of the fender shield 10 by means of two of the trunnion bar fastening bolts 20. A secondary lever 46 which engages the slotted portion 47 of the lever 44 is rotatably mounted to the fender shield 10 in proximity to the base 19, as is indicated in the drawings. The secondary lever 46 is adapted to be operated by means of a wheel wrench or the like in such a manner as to swing the slotted lever 44 up or down.

From the above description, it will be apparent that the constructions described herein provide a flexible means of connecting a fender shield to a vehicle fender in the wheel opening thereof, whereby contact is assured completely around the opening. It will further be seen that this construction provides an arrangement which is extraordinarily economical to manufacture and which is obviously rugged and reliable in use.

While I have shown particular embodiments of my invention, it will, of course, be understood that I do not wish to be limited thereto, since many modifications may be made, and I therefore contemplate by the appended claims to cover all such modifications as fall within the true spirit and scope of my invention.

I claim as my invention:

1. As an article of manufacture, an ornamental fender shield having a curved edge and a substantially straight edge, said curved edge being bent back on itself to form a recess, and a rearwardly extending fender fastening flange disposed about said curved edge having a forward edge adjustably disposed in said recess.

2. As an article of manufacture, an ornamental fender shield having a curved edge and a substantially straight edge, said curved edge being bent back on itself to form a recess, and a rearwardly extending fender fastening flange element disposed about said curved edge having a substantial portion disposed in said recess, said flange element being adapted to be moved relative to said recess.

3. As an article of manufacture, an ornamental fender shield having a curved edge and a substantially straight edge, said curved edge being bent back on itself to form a recess, and a rearwardly extending fender fastening flange element disposed about said curved edge having opposite ends secured to said shield, and an intermediate portion disposed in said recess, and means for contracting said flange.

4. As an article of manufacture, an ornamental fender shield having a curved edge and a substantially straight edge, said curved edge being bent back on itself to form a recess, and a rearwardly extending fender fastening flange element disposed about said curved edge having opposite ends secured to said shield, and an intermediate portion disposed in said recess, one of said ends being adapted to move to contract said flange.

5. As an article of manufacture, an ornamental fender shield having a curved edge and a substantially straight edge, said curved edge being bent back on itself to form a recess, a flange having one end thereof rigidly secured to said shield and an intermediate portion disposed in said recess, and means for adjustably securing the other end of said flange, thereby to vary the radius of curvature of said flange.

6. As an article of manufacture, an ornamental fender shield having a curved edge and a substantially straight edge, said curved edge being bent back on itself to form a recess, a flange element having one end thereof disposed within said recess, and means for retaining said flange element in said recess including means for expanding and contracting said flange at will.

7. As an article of manufacture, an ornamental fender shield having a curved edge and a substantially straight edge, and a rearwardly extending fender fastening flange disposed in proximity to said curved edge having one end secured to said shield near one junction point of said curved edge with said straight edge, and having a free end provided with adjustable means adapted to be secured to the opposite end of said fender shield, thereby to permit contraction and expansion of said flange in substantially the plane of the fender shield.

8. As an article of manufacture, an ornamental fender shield having a curved edge and a substantially straight edge, and a rearwardly extending fender fastening flange disposed in proximity to said curved edge having one end secured to said shield near one junction point of said curved edge with said straight edge, and having a free end adapted to be adjustably secured to the opposite end of said fender shield, and means for moving said free end downwardly with respect to said fender shield.

9. As an article of manufacture, an ornamental fender shield having a curved edge and a substantially straight edge, and a rearwardly extending fender fastening flange disposed in proximity to said curved edge having one end secured to said shield near one junction point of said curved edge with said straight edge, and having a free end adapted to be adjustably secured to the opposite side of said fender shield, and mechanical means operable from the front of said fender shield for moving said free end downwardly with respect to said fender shield.

10. The combination with an ornamental fender shield having a curved edge and a substantially straight edge, said curved edge being bent back on itself to form a recess, and a rearwardly extending fender fastening flange having an edge disposed in said recess, of an operating mechanism for moving one end of said flange downwardly which includes a bell crank lever pivotally supported at the base of said shield, and an intermediate free link connecting said crank lever to said one end of said flange, said free link being adapted to be normally disposed in an over-center position.

11. The combination with an ornamental fender shield having a curved edge and a substantially straight edge, said curved edge being bent back on itself to form a recess, and a rearwardly extending fender fastening flange disposed about said curved edge having a forward edge adjustably disposed in said recess, of an operating mechanism for moving one end of said flange downwardly which includes a slotted lever pivotally mounted on a bracket at the base of said shield and pivotally connected at its opposite end to a bracket on said one end of said flange, a second lever rotatably mounted on said bracket at the base of said shield having its opposite end arranged for movement in said slot of said first lever, and means for rotating said second lever about its mounting at the base of said shield, thereby to contract and expand said flange.

12. As an article of manufacture, an ornamental fender shield having a collapsible and expansible fender engaging edge, and means for contracting and expanding said edge at will, said edge being collapsible and expansible relative to said shield independent of said fender.

13. The combination with a vehicle fender having a wheel opening in one side thereof, of an ornamental fender shield for disposition over said opening and having a fender engaging edge portion adapted to detachably engage the shield receiving edge portion of said fender, one of said edge portions being adapted to contract and expand relative to the other of said edge portions.

GEORGE W. SCHATZMAN.